United States Patent
Park et al.

(10) Patent No.: US 9,547,360 B2
(45) Date of Patent: Jan. 17, 2017

(54) SYSTEMS HAVING A MAXIMUM SLEEP MODE AND METHOD OF OPERATING THE SAME

(71) Applicants: Young-Jin Park, Incheon (KR); Won-Seok Lee, Suwon-si (KR); Il-Guy Jung, Hwaseong-si (KR)

(72) Inventors: Young-Jin Park, Incheon (KR); Won-Seok Lee, Suwon-si (KR); Il-Guy Jung, Hwaseong-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 298 days.

(21) Appl. No.: 14/091,912

(22) Filed: Nov. 27, 2013

(65) Prior Publication Data

US 2014/0157030 A1 Jun. 5, 2014

(30) Foreign Application Priority Data

Nov. 30, 2012 (KR) ........................ 10-2012-0137812

(51) Int. Cl.
*G06F 1/32* (2006.01)

(52) U.S. Cl.
CPC .......... *G06F 1/3275* (2013.01); *G06F 1/3209* (2013.01); *G06F 1/3225* (2013.01); *Y02B 60/1225* (2013.01); *Y02B 60/1228* (2013.01); *Y02B 60/32* (2013.01)

(58) Field of Classification Search
CPC ... Y02B 60/50; Y02B 60/1225; G06F 1/3203; G06F 1/3275; H04W 52/0274
See application file for complete search history.

(56) References Cited

U.S. PATENT DOCUMENTS

| | | | |
|---|---|---|---|
| 2001/0032298 A1* | 10/2001 | Emons | G06F 1/3225 711/138 |
| 2008/0137399 A1* | 6/2008 | Chan | G11C 11/15 365/158 |
| 2010/0017637 A1 | 1/2010 | Rosay | |
| 2010/0057983 A1 | 3/2010 | Borras et al. | |
| 2010/0077244 A1 | 3/2010 | Nowak et al. | |
| 2010/0151919 A1* | 6/2010 | Caskey | H04W 52/0274 455/574 |
| 2011/0231687 A1 | 9/2011 | Takeyama et al. | |
| 2011/0320668 A1* | 12/2011 | Liu | H04L 12/2898 710/301 |
| 2012/0115552 A1* | 5/2012 | Bhattacharya | H04W 52/0261 455/574 |

FOREIGN PATENT DOCUMENTS

| | | |
|---|---|---|
| JP | 2008-287492 A | 11/2008 |
| JP | 2011-086109 A | 4/2011 |
| KR | 2005-0120344 A | 12/2005 |
| KR | 2011-0103258 A | 9/2011 |

* cited by examiner

*Primary Examiner* — Ryan Bertram
(74) *Attorney, Agent, or Firm* — Harness, Dickey & Pierce, P.L.C.

(57) ABSTRACT

A main memory system includes a main memory device including a first memory device implemented with a volatile memory and a second memory device implemented with a non-volatile memory, the main memory system being configured such that, when entering a sleep mode, the memory device reads a portion of data stored in the first memory device to store the read data in the second memory device, and, after the portion of data is read, the first memory device and the second memory device are powered off.

4 Claims, 15 Drawing Sheets

SYSTEMS HAVING A MAXIMUM SLEEP MODE AND METHOD OF OPERATING THE SAME

CROSS-REFERENCE TO RELATED APPLICATION

This U.S. Non-provisional application claims priority under 35 USC §119 to Korean Patent Application No. 10-2012-0137812, filed on Nov. 30, 2012, in the Korean Intellectual Property Office (KIPO), the disclosure of which is incorporated by reference in its entirety herein.

BACKGROUND

1. Technical Field

Example embodiments relate generally to power management of electronic devices, and more particularly to a main memory system, a computer system and a method of operating a system to receive a transmission signal from an external device while keeping a low-power state in a maximum or, alternatively, high-level sleep mode.

2. Discussion of the Related Art

According to increasing demands on electronic devices to process a large amount of data with a high speed, it becomes important to implement semiconductor products with a higher degree of integration, a higher performance and a lower power. Particularly in case of mobile devices operating based on an imbedded battery, it is critical to minimize power consumption.

In general, the mobile device is in a partially operating state for a longer time than in a fully operating state. Accordingly it is required to reduce power consumption by powering off a portion of the mobile device to enter a standby mode. In this case, with maintaining the low-power state, it is required to receive and process a signal and/or data transmitted wirelessly from the external device.

SUMMARY

Some example embodiments of the inventive concepts provide systems and methods for reducing power consumption by powering off a processor and/or a main memory device when entering a maximum or, alternatively, high-level sleep mode.

Some example embodiments of the inventive concepts provide systems and methods for receiving a transmission signal from an external device to store associated data in a main memory device with maintaining a low-power state of the maximum or, alternatively, high-level sleep mode.

According to an example embodiment of the inventive concepts, a main memory includes a main memory device including a first memory device implemented with a volatile memory and a second memory device implemented with a non-volatile memory, the main memory system being configured such that, when entering a sleep mode, the memory device reads a portion of data stored in the first memory device to store the read data in the second memory device, and, after the portion of data is read, the first memory device and the second memory device are powered off.

According to an example embodiment, the first memory device includes a dynamic random access memory (DRAM) and the second memory device includes a spin-transfer torque magneto-resistive random access memory (STT-MRAM).

According to an example embodiment, the main memory device further includes a data transfer manager configured to store data in the second memory device by transferring data stored in the first memory device to the second memory device.

According to an example embodiment, the main memory system is configured such that when a transmission signal is received from an external device, the second memory device is activated to store data of the transmission signal and then the second memory device is powered off.

According to an example embodiment of the inventive concepts, a computer system includes a call processor configured to run a realtime operating system; an application processor configured to run a general purpose operating system; and a main memory device including a first memory device implemented with a volatile memory and a second memory device implemented with a non-volatile memory, the main memory device configured to store data for operations of the call processor and the application processor, and configured to, when entering a high-level sleep mode, read a portion of data stored in the first memory device to store the read data in the second memory device, and then the first memory device and the second memory device are powered off.

According to an example embodiment, the second memory device includes a spin-transfer torque magneto-resistive random access memory (STT-MRAM).

According to an example embodiment, the application processor includes a memory controller configured to control the first memory device and the second memory device.

According to an example embodiment, the call processor includes a memory controller configured to control the second memory device.

According to an example embodiment, the computer system is configured such that when a transmission signal is received from an external device during the high-level sleep mode, the high-level sleep mode is maintained until a wake-up signal is activated.

According to an example embodiment, the transmission signal includes at least one of a text message signal, a call signal and a push message signal.

According to an example embodiment, the computer system is configured such that when the call processor receives the transmission signal from the external device during the high-level sleep mode, the second memory device is activated to store data of the transmission signal and then the second memory device is powered off.

According to an example embodiment, the computer system is configured such that when the call processor receives a call signal from the external device during the high-level sleep mode and the wake-up signal is not activated until the call signal expires, the second memory device is activated to store a call record identifying the call signal and then the second memory device is powered off.

According to an example embodiment, the computer system is configured such that when entering the high-level sleep mode, powers supplied to the call processor and the application processor are reduced.

According to an example embodiment, the computer system further includes a push notification controller configured to count a reference time interval during the high-level sleep mode to activate the call processor periodically in accordance with the reference time interval.

According to an example embodiment, the computer system is configured such that when the push notification controller activates the call processor, the call processor receives all of push messages transmitted during the predetermined time interval and stores the push messages in the second memory device, and, after the push messages are received and stored by the call processor, the call processor and the second memory device are powered off.

According to an example embodiment, the second memory device includes a queue block, and the computer system is configured such that the push messages are stored in the queue block, and, during the high-level sleep mode, the queue block is activated to receive the push messages while neither the rest of the second memory nor the first memory are activated.

According to an example embodiment, the computer system is configured such that the high-level sleep mode corresponds to a state in which the application processor and the main memory device are powered off.

According to an example embodiment, the computer system is configured such that when the computer system does not receive a signal from an external device for a set time interval in a first sleep mode, the computer system enters the high-level sleep mode from the first sleep mode.

According to an example embodiment, the computer system is configured such that set time interval is configurable by a user.

According to an example embodiment, when the computer system receives an input signal of a user in a normal mode, the computer system enters the high-level sleep mode from the normal mode, the normal mode being a mode in which power levels of the application processor and the main memory are not reduced.

According to an example embodiment of the inventive concepts, a computer system includes a call processor configured to drive a realtime operating system; an application processor configured to drive a general purpose operating system; a push notification controller configured to count a reference time interval during a sleep mode to activate the call processor periodically in accordance with the reference time interval; and a main memory device configured to store data for operations of the call processor and the application processor, the computer system being configured such that the main memory device is powered off during the sleep mode and only a portion of the main memory device is activated when the computer system receives a transmission signal from an external device during the sleep mode.

According to an example embodiment, the main memory device includes a queue block, the computer system is configured such that push messages are stored in the queue block and, during the high-level sleep mode, the queue block is activated to receive the push messages while the rest of the main memory is not activated.

According to an example embodiment of the inventive concepts, a method of operating a system including a main memory device including a first memory device implemented with a volatile memory and a second memory device implemented with a non-volatile memory, includes reading a portion of data stored in the first memory device in response to a sleep mode signal; storing the read data in the second memory device; entering a sleep mode by powering off the first memory device and the second memory device after the read data are stored in the second memory device; receiving a transmission signal from an external device; and maintaining the sleep mode after receiving the transmission signal.

According to an example embodiment, the first memory device includes a dynamic random access memory (DRAM) and the second memory device includes a spin-transfer torque magneto-resistive random access memory (STT-MRAM).

According to an example embodiment, the transmission signal includes at least one of a text message signal, a call signal and a push message signal.

According to an example embodiment, the method further includes receiving the transmission signal through a call processor; activating at least a portion of the second memory device to store data of the transmission signal; and powering off the second memory device after storing the data of the transmission signal.

According to an example embodiment, the method further includes when the transmission signal is a call signal, receiving the transmission signal through a call processor; when the call signal expires without a wake-up signal being activated, activating at least a portion of the second memory device and storing a call record identifying the call signal; and powering off the second memory device after storing the call record.

According to an example embodiment, the method further includes reducing powers supplied to a call processor and an application processor of the system when entering the sleep mode.

According to an example embodiment, the method further includes counting a reference time interval during the sleep mode using a push notification controller; periodically activating a queue block in the second memory device and the call processor, in accordance with the reference time interval; when the push notification controller activates the call processor, receiving push messages transmitted during the reference time interval; storing the push messages in the queue block; and powering off the call processor and the queue block after the push messages are stored.

According to an example embodiment of the inventive concepts, a computing system includes a main memory device including a first memory device implemented with a volatile memory and a second memory device implemented with a non-volatile memory; and a power management unit configured to control a supply of power to the main memory device, the computing system being configured such that, when the main memory device enters a sleep mode, the main memory device reads data stored in the first memory device, the main memory stores the read data in the second memory device, and, after the read data is stored in the second memory device, the power management unit powers off the first memory device and the second memory device.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF THE EMBODIMENTS

Figure 1:
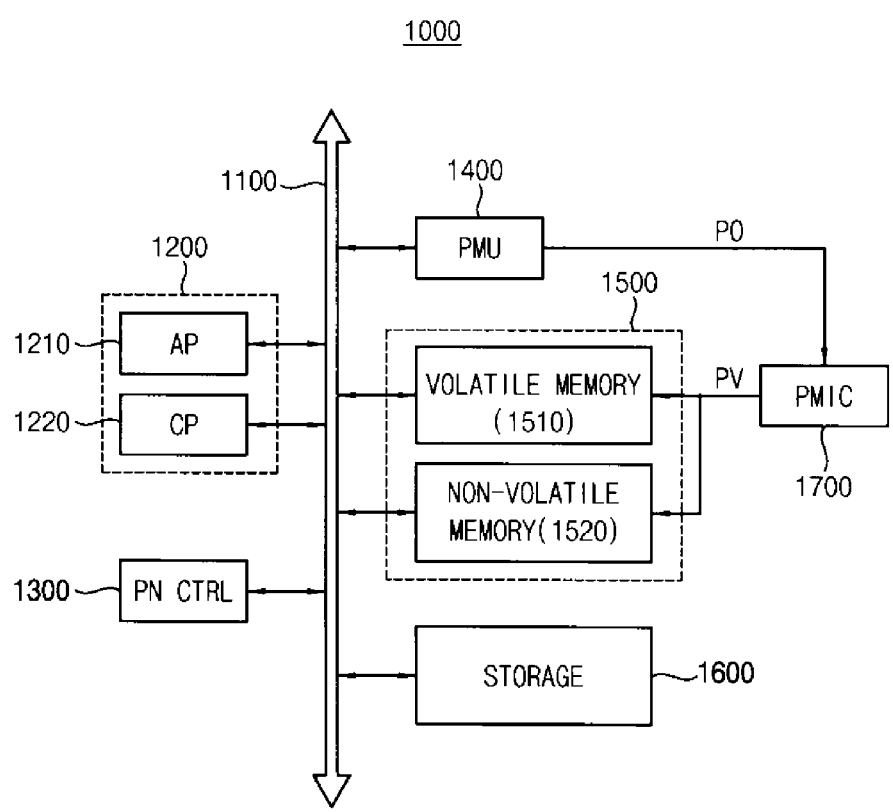
FIG. 1 is a block diagram illustrating a computer system according to an example embodiment of the inventive concepts.

Various example embodiments will be described more fully hereinafter with reference to the accompanying drawings, in which some example embodiments are shown. Example embodiments of the inventive concepts may, however, be embodied in many different forms and should not be construed as limited to the example embodiments set forth herein. Rather, these example embodiments are provided so that this disclosure will be thorough and complete, and will fully convey the scope of example embodiments of the present inventive concepts to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of example embodiments of the inventive concepts. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of example embodiments of the inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a computer system according to an example embodiment of the inventive concepts.

Referring to FIG. 1, a computer system may include a processor 1200, a push notification controller (PN CTRL) 1300, a power management unit (PMU) 1400, a main memory device 1500, a storage device 1600 and a power management integrated circuit (PMIC) 1700, which are coupled through a system bus 1100.

The computer system 1000 may be implemented as a personal computer, a smart phone, a tablet computer, a net-book, an e-reader, etc.

The processor 1200 may be implemented to execute software for performing particular calculations and/or tasks. For example, the processor 1200 may include a microprocessor and/or a central processing unit. When the computer system 1000 is implemented as a mobile device such as a smart phone, the processor 1200 may include an application processor (AP) 1210 and a call processor (CP) 1220. The application processor 1210 runs, operates based on, or drives a general purpose operating system and the call processor 1220 runs, operates based on, or drives a realtime operating system. The application processor 1210 and the call processor 1220 may be implemented in distinct chips or in a common chip.

The push notification controller 1300 may be implemented as a low-power processor for periodically receiving push messages in a maximum or, alternatively, high-level sleep mode. The push notification controller 1300 may count a predetermined time interval during the maximum or, alternatively, high-level sleep mode to activate the call processor 1220 by a period corresponding to the predetermined time interval.

The main memory device 1500 includes a first memory device 1510 and a second memory device 1520 that store data for operations of the application processor 1210 and the call processor 1220. The first memory device 1510 may be implemented with a volatile memory such as a static random access memory (SRAM), a dynamic random access memory (DRAM), etc. and the second memory device 1520 may be implanted or, alternatively, implemented with a non-volatile memory such as a phase change random access memory (PRAM), a ferroelectric random access memory (FeRAM), a magneto-resistive random access memory (MRAM), a spin-transfer torque MRAM (STT-MRAM). Particularly the first memory device 1510 may be implemented with the DRAM and the second memory device 1520 may be implemented with the STT-MRAM.

When the main memory device enters the maximum or, alternatively, high-level sleep mode, the main memory device read a portion of data stored in the first memory device 1510 to store the read data in the second memory device 1520, and then the first memory device 1510 and the second memory device 1520 are powered off. A memory controller, which may be included in the processor 1200, or an additional firmware may control the main memory device 1500 to enter and escape from a low-power mode including the maximum or, alternatively, high-level sleep mode.

The power management unit 1400 may control powers provided to the respective components in the computer system 1000. For example, when the power management unit 1400 receives a low-power mode signal from the processor 1200, the power management unit 1400 may deactivate a power control signal PO so that to the power management integrated circuit 1700 may block a power PV or a power supply voltage to the main memory device 1500 and so on. The power management unit 1400 continues consuming the power, but the power consumption of the power management unit 1400 is trivial compared with the power consumption of the entire system 1000. Accordingly the power consumption of the computer system may be significantly reduced in the low-power mode. The power management unit 1400 may activate the power control signal PO in response to a wake-up signal.

The power management integrated circuit 1700 may provide the power to the processor 1200, the main memory device 1500, etc. While the computer system 1000 is in the low-power mode, the power management integrated circuit 1700 may provide the power only a portion of the components performing essential operations such a realtime clock driving, and the power management integrated circuit 1700 may block the power to the other components. When the wake-up signal is input from an external device, the other components may be powered again to enable the computer system 1000.

The storage device 1600 may be implemented with a non-volatile memory such as a hard disk drive (HDD), a solid state drive (SSD), an embedded multimedia card (eMMC), etc. The storage device 1600 may have an operational speed slower than the main memory device 1500 but the storage device 1600 may store a large amount of data for relatively a long time.

Figure 2:
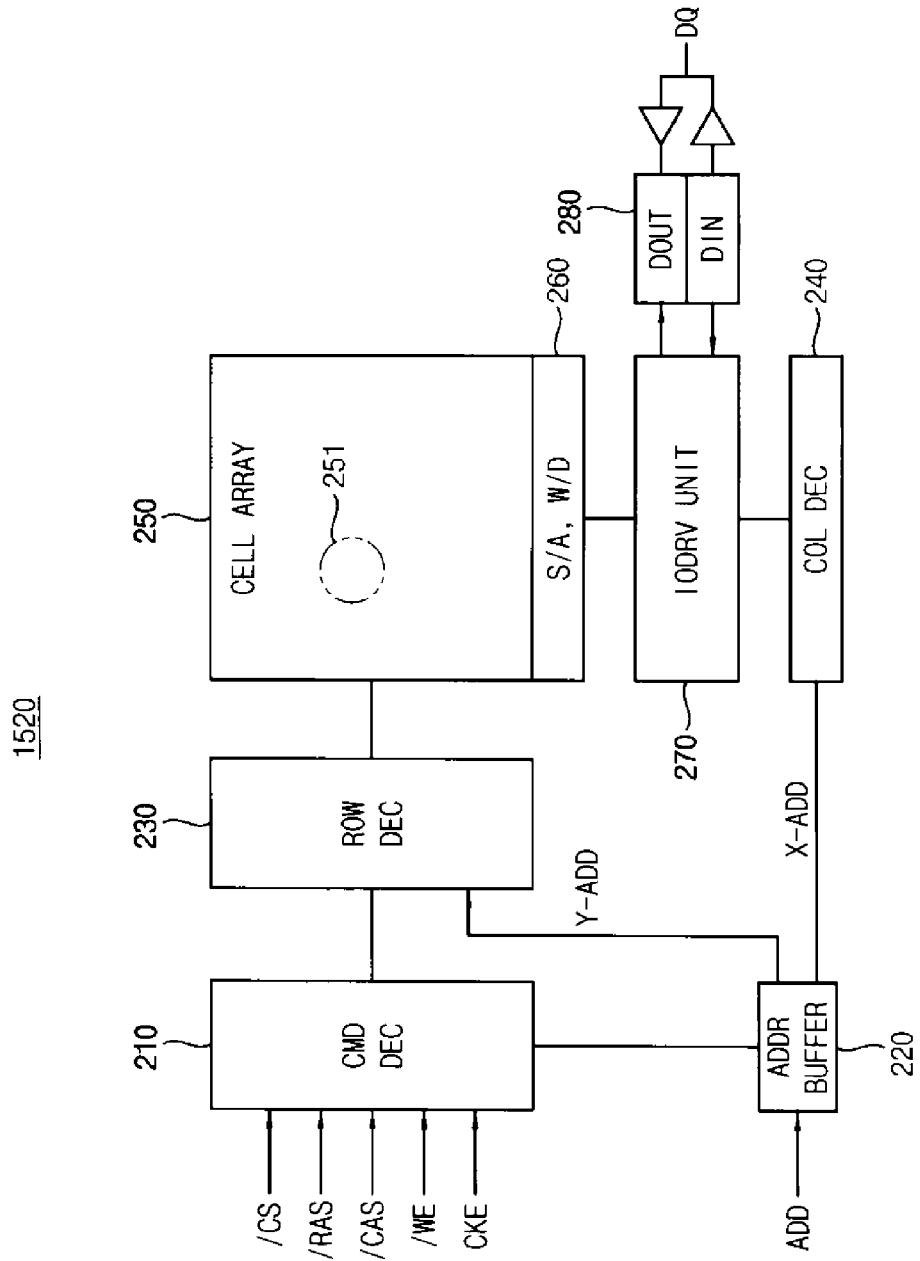
FIG. 2 is a block diagram a non-volatile memory device according to an example embodiment of the inventive concepts.

FIG. 2 is a block diagram a non-volatile memory device according to an example embodiment of the inventive concepts.

Referring to FIGS. 1 and 2, a non-volatile memory device 1520 may include a command decoder (CMD DEC) 210, an address buffer (ADDR BUFFER) 220, a row decoder (ROW DEC) 230, a column decoder (COL DEC) 240, a memory cell array 250, a sense-amplifier/write-driver (S/A, W/D) unit 260, an input-output driver unit 270 and a data input-output unit 280.

The command decoder 210 receives the command CMD from an external device such as the memory controller and performs a decoding operation on the received command. The command decoder 210 may perform the decoding operation based on a chip select signal /CS, a row address strobe signal /RAS, a column address strobe signal CAS/, a write enable signal /WE and a clock enable signal CKE. After the decoding operation is completed, the non-volatile memory device 1520 may be controlled to perform the command CMD from the memory controller.

The address signal ADD from the external device is stored in the address buffer 220. The address buffer 220 provides a row address Y-ADD to the row decoder 230 and a column address X-ADD to the column decoder 240.

The row decoder 230 and the column decoder 240 may include a plurality of switches, respectively. The row decoder 230 may perform a switching operation in response to the row address Y-ADD to select a wordline WL and the column decoder 240 may perform a switching operation in response to the column address X-ADD to select a bitline BL. The memory cell array 250 includes a plurality of memory cells. The memory cell 251, which is disposed in the cross area of the wordline WL and the bitline BL, may be selected to write or read data.

The memory cell 251 may be an STT-MRAM cell. The STT-MRAM cell 251 has characteristics of non-volatility and has a relatively small or great resistance value depending on the written data.

In a write operation, the data from the external device are transferred via the data input-output unit 280, the input-output driver unit 270 the sense-amplifier/write-driver unit 260 and stored in the STT-MRAM cell as the resistance value.

In a read operation, a data voltage corresponding to the resistance value of the memory cell 251 is provided to the sense-amplifier/write-driver unit 260. The sense-amplifier/write-driver unit 260 may include a plurality of sense amplifier circuits for sensing and amplifying the data voltage to output a digital signal corresponding to the data voltage. The signals from the sense-amplifier/write-driver unit 260 are transferred to the data input-output unit 280 via the input-output driver unit 270. The data input-output unit 280 may include an output buffer DOUT and an input buffer DIN. The data input-output unit 280 output the transferred data DQ to the memory controller.

Figure 3:
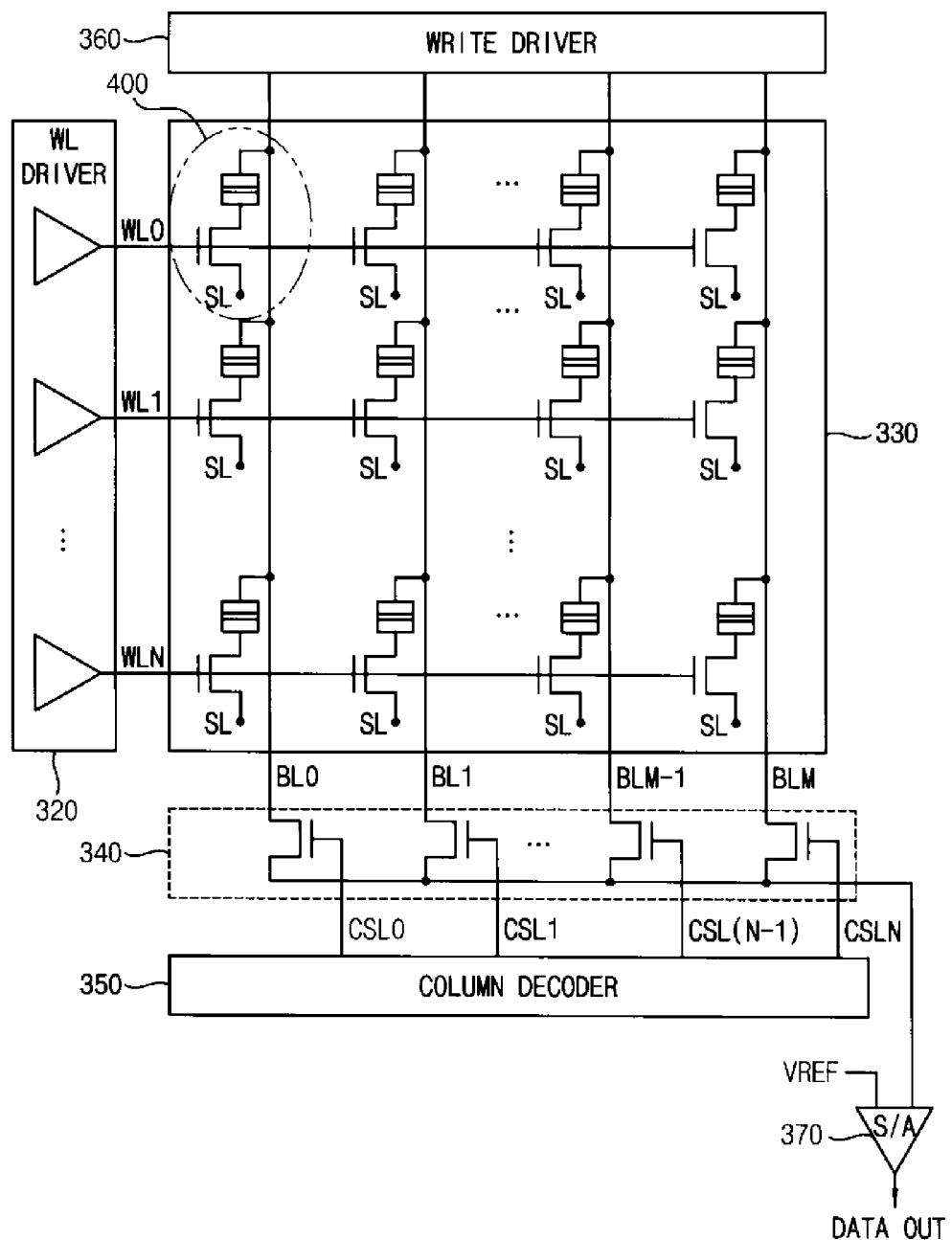
FIG. 3 is a circuit diagram illustrating an example of a memory cell array in the non-volatile memory device of FIG. 2.

FIG. 3 is a circuit diagram illustrating an example of a memory cell array in the non-volatile memory device of FIG. 2.

Referring to FIG. 3, a memory cell array 330 includes a plurality of wordlines WL0~WLN, a plurality of bitlines BL0~BLM and a plurality of memory cells 400 respectively disposed in cross areas of the wordlines WL0~WLN and the bitlines BL0~BLM. When the memory cell 400 is implemented with an STT-MRAM cell, each memory cell 400 may include a magnetic tunnel junction (MTJ) element of magnetic materials.

The memory cell 400 may include a cell transistor and the MTJ element. The cell transistor is turned on or off in response to a signal driven by a wordline driver 320. The wordline driver 320 outputs wordline voltages to select one of the wordlines WL0~WLN. The wordline driver 320 may include a means for decoding the row address, or the decoded address may be provided to the wordline driver 320 from the row decoder 230 in FIG. 2. The cell transistor and the MTJ element in each memory cell 400 are coupled between a source line SL and one of the bitlines BL0~BLM. Even though not illustrated in FIG. 3, a plurality of memory cells may be coupled to the common source line. In some embodiments, the memory cell array 330 may be partitioned to at least two cell regions and the cell regions may be coupled to the different source lines.

In some example embodiments, the MTJ element may be replaced with phase-change random access memory (PRAM) using phase-change materials, resistance random access memory (RRAM) using complex metal oxide of variable resistance, ferroelectrics random access memory (FRAM) using ferroelectric materials and magneto-resistive random access memory (MRAM) using ferromagnetic materials. Such resistive memories have the resistance value depending on the magnitude and/or the direction of the applied current or voltage and have characteristics of non-volatility of maintaining the resistance value even though power is off.

The bitlines BL0~BLM are coupled to a write driver 360. The write driver 360 may perform a write operation by applying currents or voltages to the memory cells in response to an external command.

The column decoder 350 generates column select signals CSL0~CSLM to select one of the bitlines BL0~BLM. For example, a switching unit 340 including switches coupled to the bitlines BL0~BLM may be implemented and the column select signals CSL0~CSLM may be provided to the switching unit 340. In the read operation, the data voltage depending on the resistance value of the memory cell 400 is transferred to the sense amplifier 370 via the corresponding bitline. The sense amplifier 370 senses and amplifies the difference between the data voltage and a reference voltage VREF to output a digital signal.

Figure 4:
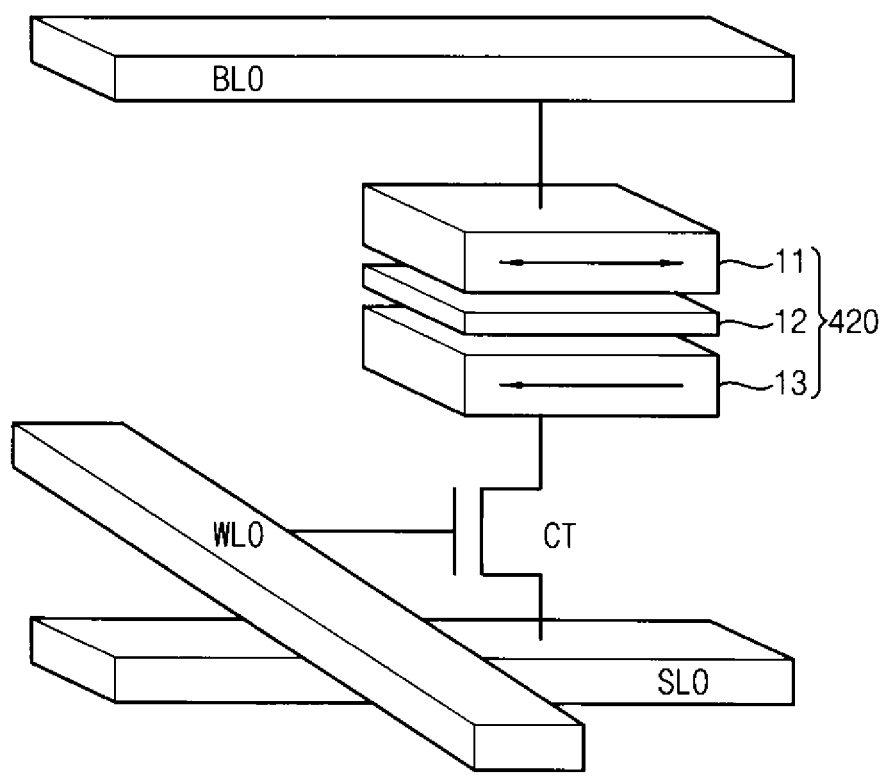
FIG. 4 is a diagram illustrating an example of a spin-transfer torque magneto-resistive random access memory (STT-MRAM) cell in the memory cell array of FIG. 3.

FIG. 4 is a diagram illustrating an example of a spin-transfer torque magneto-resistive random access memory (STT-MRAM) cell in the memory cell array of FIG. 3.

Referring to FIG. 4, the STT-MRAM cell may include an MTJ element 420 and a cell transistor CT. A gate of the cell transistor CT is coupled to a corresponding wordline WL0, a first electrode of the cell transistor CT is coupled to a corresponding bitline BL0 via the MTJ element 420, and a second electrode of the cell transistor CT is coupled to a source line SL0.

The MTJ element 420 may include a pinned layer 13, a free layer 11 and a barrier layer 12 between the two layers 11 and 13. The magnetization direction of the pinned layer 13 is fixed but the magnetization direction of the free layer 11 may be varied, according to the written data, between the same direction as, or opposite direction to, the magnetization direction of the pinned layer 13. In some cases, an anti-ferromagnetic layer may be further included in the MTJ element to enforce the magnetization direction of the pinned layer 13. The MTJ element 420 may be implemented to form horizontal magnetization as illustrated in FIG. 4 or vertical magnetization.

To perform the write operation of the STT-MRAM cell, a high level voltage is applied to the wordline WL0 to turn on the cell transistor CT, a write current is applied between the bitline BL0 and the source line SL0.

To perform the read operation of the STT-MRAM cell, a high level voltage is applied to the wordline WL0 to turn on the cell transistor CT, a read current is applied to flow from the bitline BL0 to the source line SL0, and the resistance value is measured to determine the data stored in the MTJ element 420.

In general, the memory device including the DRAM performs a refresh operation for maintaining the stored data and thus the power is consumed continuously even while the DRAM is not accessed.

Figure 5:
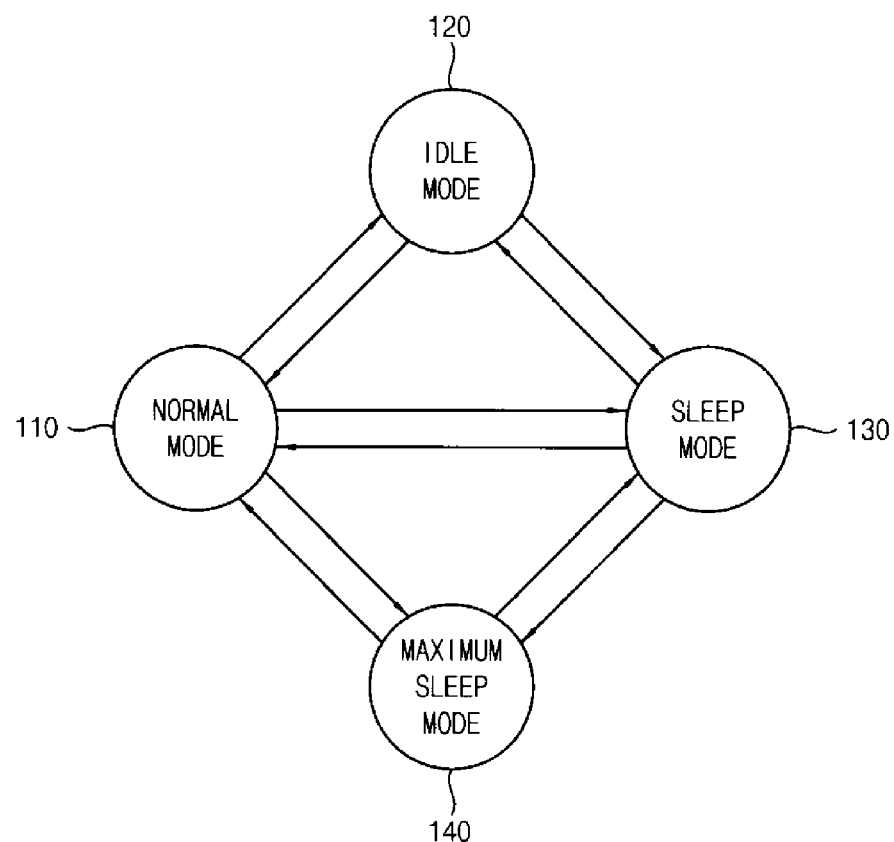
FIG. 5 is a diagram illustrating operation modes of a computer system according to an example embodiment of the inventive concepts.

FIG. 5 is a diagram illustrating operation modes of a computer system according to an example embodiment of the inventive concepts.

Referring to FIGS. 1 and 5, the main memory device 1500 may operate one of operation modes including a normal mode 110, an idle mode 120, a sleep mode 130 and a maximum or, alternatively, high-level sleep mode 140.

The main memory device 1500 may change the operation mode from one to another among the operation modes 110, 120, 130 and 140, in response to a command from an external device or a signal input through an external pin such as a CKE pin. In addition, the main memory device 1500 may enter the low-power modes 130 and 140 when the idle mode 120 or the normal mode 110 is maintained for a predetermined time interval. For example, the main memory device 1500 may enter the idle mode 120 from the normal mode 110 when any command is not received for a first time interval in the normal mode 110. According to elapse of the predetermined idle times, the main memory device 1500 may sequentially transition from the idle mode 120 to the sleep mode 130 and then to the maximum or, alternatively, high-level sleep mode 140. For example, a high-level sleep mode may be defined as a sleep mode which is higher, for example in degree of power consumption reduction, than the sleep mode 130, and a maximum sleep mode may be defined as a sleep mode which is highest, for example in degree of power consumption reduction, out of all available sleep modes of the main memory device 1500. When the wake-up signal or the command is received from the external device during the idle mode 120, the sleep mode 130 or the maximum or, alternatively, high-level sleep mode, the main memory device 1500 may return to the normal mode 110 to perform the required operation.

Figure 6:
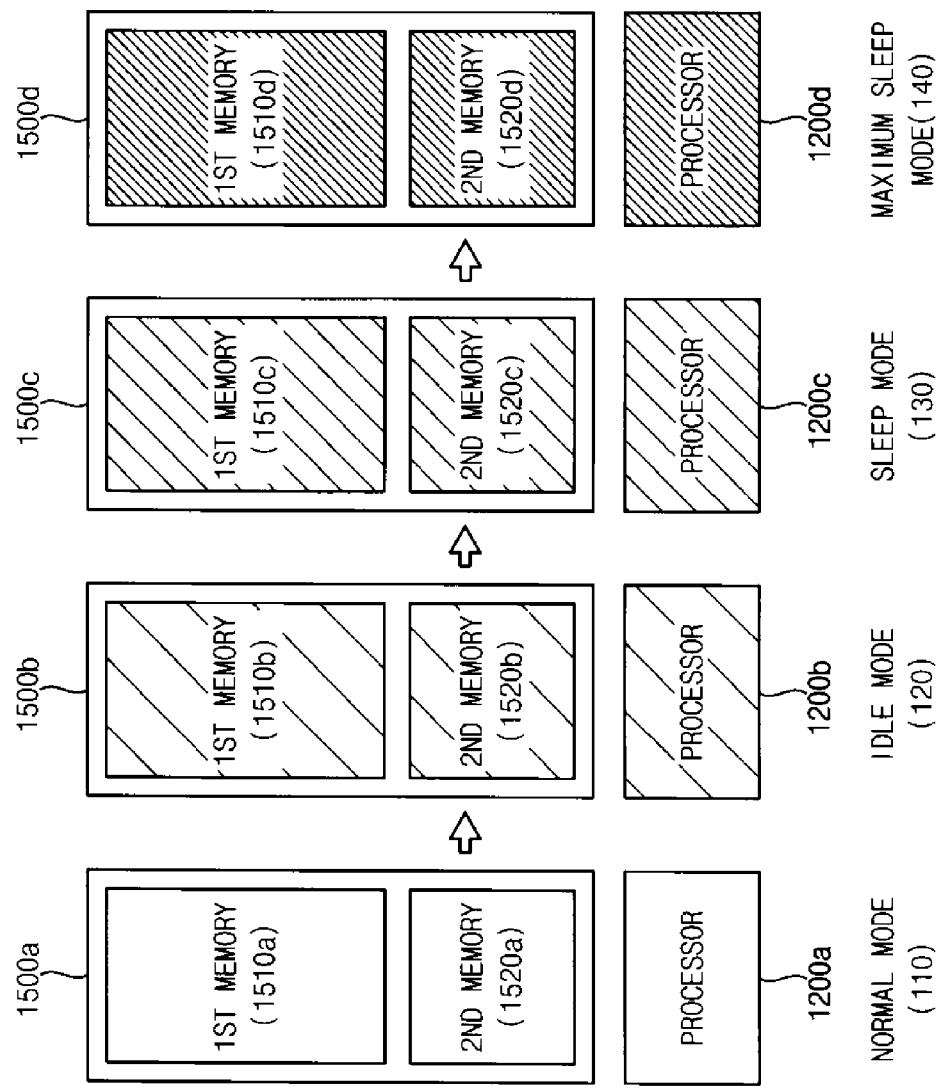
FIG. 6 is a diagram illustrating states of a processor and a main memory device with respect to operation modes of a computer system according to an example embodiment of the inventive concepts.

FIG. 6 is a diagram illustrating states of a processor and a main memory device with respect to operation modes of a computer system according to an example embodiment of the inventive concepts.

When entering the low-power modes, at least a portion of the main memory device 1500 may be powered off to reduce the power consumption. The powered-off portion may be determined based on the level of the low-power mode. As the level of the low-power mode is increased, the more circuit blocks may be powered off.

Referring to FIGS. 5 and 6, the main memory device 1500 includes the first memory device 1510 and the second memory device 1520, which store the data for the operations of the processor 1200. The operation modes of the main memory device 1500 may be changed according to the operation modes of the processor 1200. In FIG. 6, the operation modes of the processor 1200 and the main memory device 1500 are represented using the subscripts a, b, c and d. As described above, the first memory device 1520 may be implemented with the DRAM and the second memory device 1520 may be implemented with the STT-MRAM.

In a normal mode 110, all of the processor 1200a and the first and second memory devices 1510a and 1520a in the main memory device 1500a are enabled to perform the normal operation.

In an idle mode 120 waiting for an input signal from an external device, the processor 1200b and the first and second memory devices 1510b and 1520b are enabled, but the clock frequency of the system and/or the refresh period of the first memory device 1510b may decreased to reduce the power consumption.

In a sleep mode 130, to further reduce the power consumption, the operational speed of the processor 1200c may be reduced and a portion of the main memory device 1500c may be powered off as far as the stored data are maintained. For example, most peripheral circuits of the first memory device 1510c including the DRAM may be powered off but the memory cell array and the refresh circuit may be powered on to maintain the stored data with the periodic refresh operation.

In a maximum or, alternatively, high-level sleep mode 140, to reduce or, alternatively, minimize the power consumption, a lower or, alternatively, minimum power is provided to the processor 1200d and the main memory device 1500d including the first memory device 1510d and the second memory device 1520d. In the maximum or, alternatively, high-level sleep mode 140, the first memory device 1510d implemented with the volatile memory may be powered off and the stored data may be lost. In addition, a call processor for receiving an external transmission signal, which may be included in the processor 1200d, may be disabled in some example embodiments.

Figure 7:
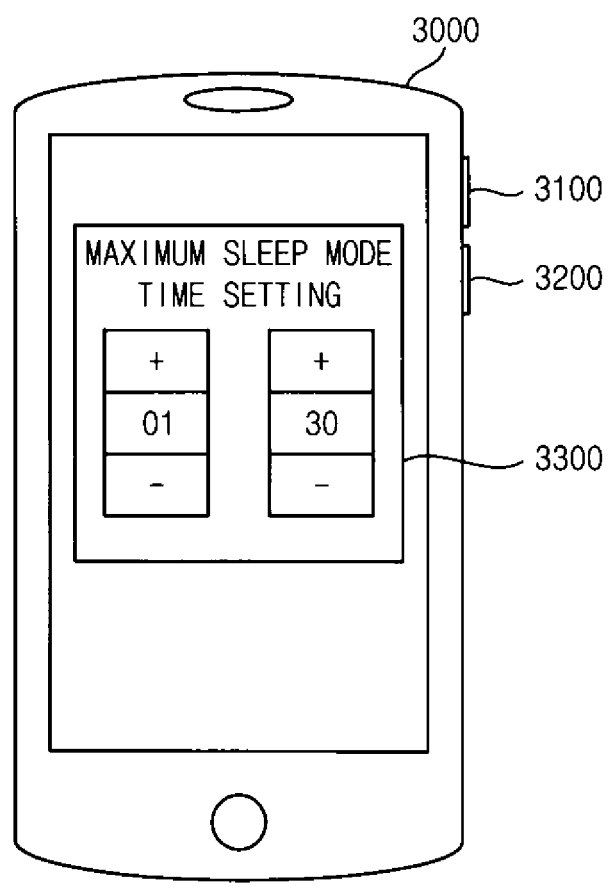
FIG. 7 is a diagram illustrating an example user interface of a mobile device for setting a maximum or, alternatively, high-level sleep mode according to an example embodiment of the inventive concepts.

FIG. 7 is a diagram illustrating an example user interface of a mobile device for setting a maximum or, alternatively, high-level sleep mode according to an example embodiment of the inventive concepts.

The user interface for controlling the maximum or, alternatively, high-level sleep mode in a mobile device 3000 may be implemented in hardware, software or a combination thereof.

In an example embodiment, the user interface may be implemented in hardware such that the user can control the maximum or, alternatively, high-level sleep mode through a power button 3100 or a low-power button 3200. For example, when the user wants to launch the maximum or, alternatively, high-level sleep mode, the user may push the power button 3100 consecutively two or more times, or the user may push the low-power button 3200. The user interface in hardware may be implemented variously.

In an example embodiment, the time for entering the maximum or, alternatively, high-level sleep mode may be set by the user through the menu window 3300 that is displayed on the mobile device 3000 by the software for the user interface. The mobile device 300 may enter the maximum or, alternatively, high-level sleep mode if the external input is not received for the time set by the user.

Hereinafter, a computer system and a method of operating a computer system according to an example embodiment are described with reference to referring to FIGS. 8 through 11. The computer system may receive an external transmission signal in the maximum or, alternatively, high-level sleep mode by enabling or activating, in the maximum or, alternatively, high-level sleep mode, the call processor configured to drive a realtime operating system (OS).

Figure 8:
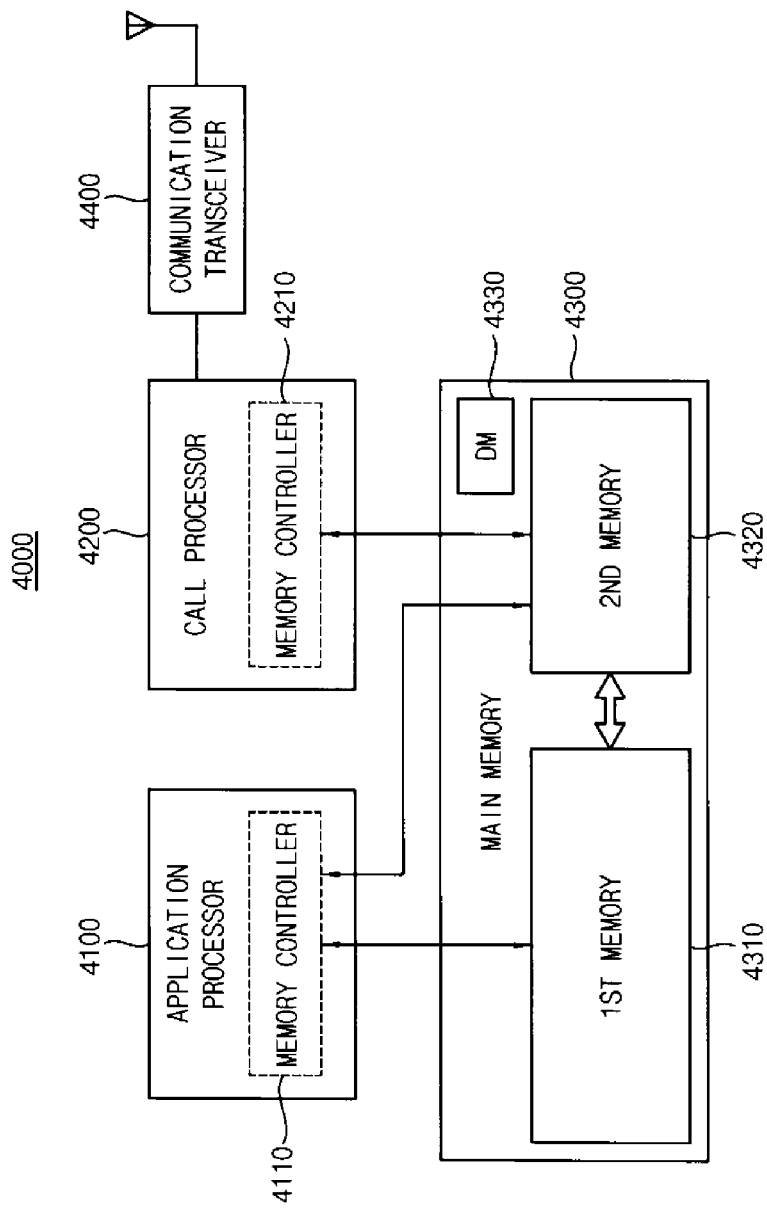
FIG. 8 is a block diagram illustrating a computer system according to an example embodiment of the inventive concepts.

FIG. 8 is a block diagram illustrating a computer system according to an example embodiment of the inventive concepts.

Referring to FIG. 8, a computer system 4000 includes an application processor 4100, a call processor 4200, a main memory device 4300 and a communication transceiver 4400. The main memory device 4300 may include a first memory device 4310, a second memory device 4320 and a data transfer manager (DM) 4330.

The application processor 4100 runs or drives a general purpose operating system (OS). The application processor 4100 may perform various user interface tasks such as running a game, a news service, a map service, banking task, etc. The application processor 4100 may include a memory controller 4110 for controlling the access to the first and second memory devices 4310 and 4320. The memory controller 4110 may further control the operation modes of the main memory device 4300.

The call processor 4200 runs or drives a realtime OS. The call processor 4200 may perform the communication tasks such as handling a text message, a (phone) call, a push message, etc. The call processor 4200 may include a memory controller 4210 for controlling the second memory device 4320. The call processor 4200 may receive wireless signals through the wireless communication transceiver 4400. For example, the wireless communication transceiver 4400 may convert an optical or, alternatively, radio signal received by an antenna to an electrical signal that may be processed by the call processor 4200. The call processor 4200 processes the signal from the wireless communication transceiver 4400 and transfers the processed signal or data to the main memory device 4300. In addition, the wireless communication transceiver 4400 may convert a signal from the call processor 4200 to a wireless signal and transmit the wireless signal through the antenna.

The main memory device 4300 stores the data for the operations of the application processor 4100 and the call processor 4200. The main memory device 4300 may include the first memory device 4310 implemented with a volatile memory, the second memory device 4320 implemented with a non-volatile memory, and the data transfer manager 4330. In an example embodiment, the first memory device 4310 may include the DRAM and the second memory device 4320 may include the STT-MRAM.

The general purpose OS is loaded in the first memory device 4310 and the data for the operations of the application processor 4100 and the call processor 4200 are stored in the first memory device 4310. The realtime OS or the minimized OS for the simple operation of the system and the associated data may be loaded or stored in the second memory device 4200.

When entering the maximum or, alternatively, high-level sleep mode, the main memory device 4300 may read a portion of data stored in the first memory device 4310 to store the read data in the second memory device 4320, and then the first memory device 4310 and the second memory device 4320 may be powered off. The data associated with the wireless communication, which are stored in the heap region of the first memory device 4310, may be copied and moved to the second memory device 4320. For example, the data required for a social network service (SNS), an e-mailing service, a clouding service, a remote access service, etc. may be copied from the first memory device 4310 to the second memory device 4320. The data transfer manage 4330 may be configured to control such data transfer from the first memory device 4310 to the second memory device 4320. Elements of the computer system 4000 may be powered off by, for example, a power managing circuit included in the computer system 4000.

Figure 9:
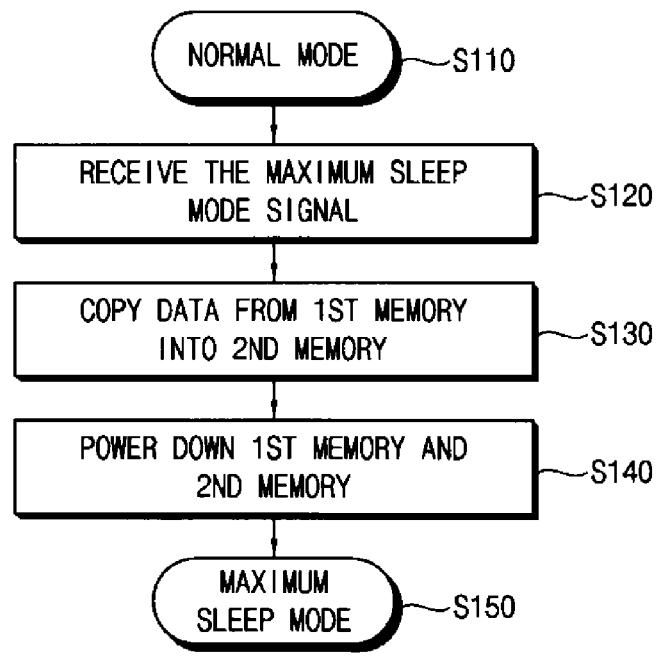
FIG. 9 is a flowchart illustrating a method of operating a computer system according to an example embodiment of the inventive concepts.

FIG. 9 is a flowchart illustrating a method of operating a computer system according to an example embodiment of the inventive concepts.

Referring to FIGS. 8 and 9, the application processor 4100, the call processor 4200 and the main memory device 4300 may be enabled to perform the general operations in the normal mode (S110).

When the idle mode continue for more than the predetermined time interval or when the power management unit 1400 receives a command from an external device or a maximum or, alternatively, high-level sleep mode signal (S120) through an external pin such as a CKE pin, the power management unit 1400 may launch the maximum or, alternatively, high-level sleep mode, e.g., through the power control signal PO provided to the power management integrated circuit 1700, as described with reference to FIG. 1.

As described above, the main memory device 4300 may copy the data from the first device 4310 to the second memory device 4320 (S130) for entering the maximum or, alternatively, high-level sleep mode.

After the necessary data are copied from the first device 4310 to the second memory device 4320, the power management unit 1400 in FIG. 1 may decrease or block the power provided to the first device 4310 and the second memory device 4320 (S140). Through the data transfer (S130) and the power control (S140), the main memory device 4300 may enter the maximum or, alternatively, high-level sleep mode finally.

Figure 10:
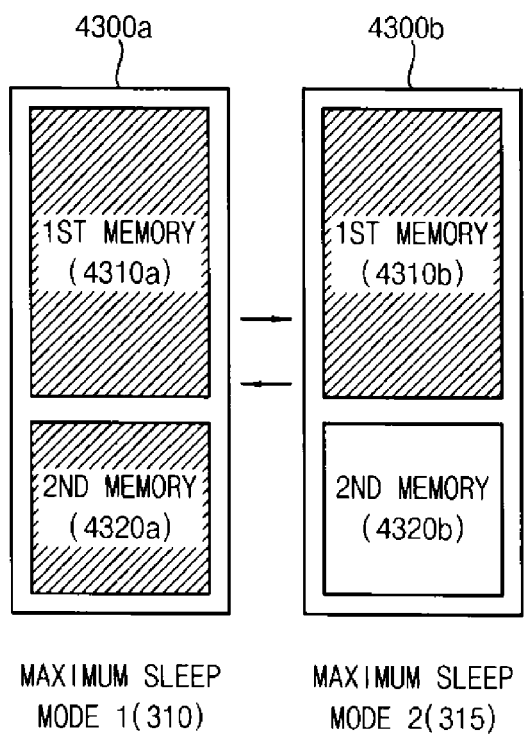
FIG. 10 is a diagram illustrating states of a main memory device in a maximum or, alternatively, high-level sleep mode according to an example embodiment of the inventive concepts.

FIG. 10 is a diagram illustrating states of a main memory device in a maximum or, alternatively, high-level sleep mode according to an example embodiment of the inventive concepts.

Referring to FIGS. 8 and 10, in a first maximum or, alternatively, high-level sleep mode 310, the power provided to the first memory device 4310a and the second memory device 4310b in the main memory device 4300a is lowered or blocked. In a second maximum or, alternatively, high-level sleep mode 320, for example, when the call processor 4200 receives the transmission signal from the external device, the second memory device 4320b is enabled temporarily to store the data of the transmission signal whereas the first memory device 4310b maintains the power-down state or the power-off state. In other words, the first maximum or, alternatively, high-level sleep mode 310 and the second maximum or, alternatively, high-level sleep mode 315 may occur alternatively.

Figure 11:
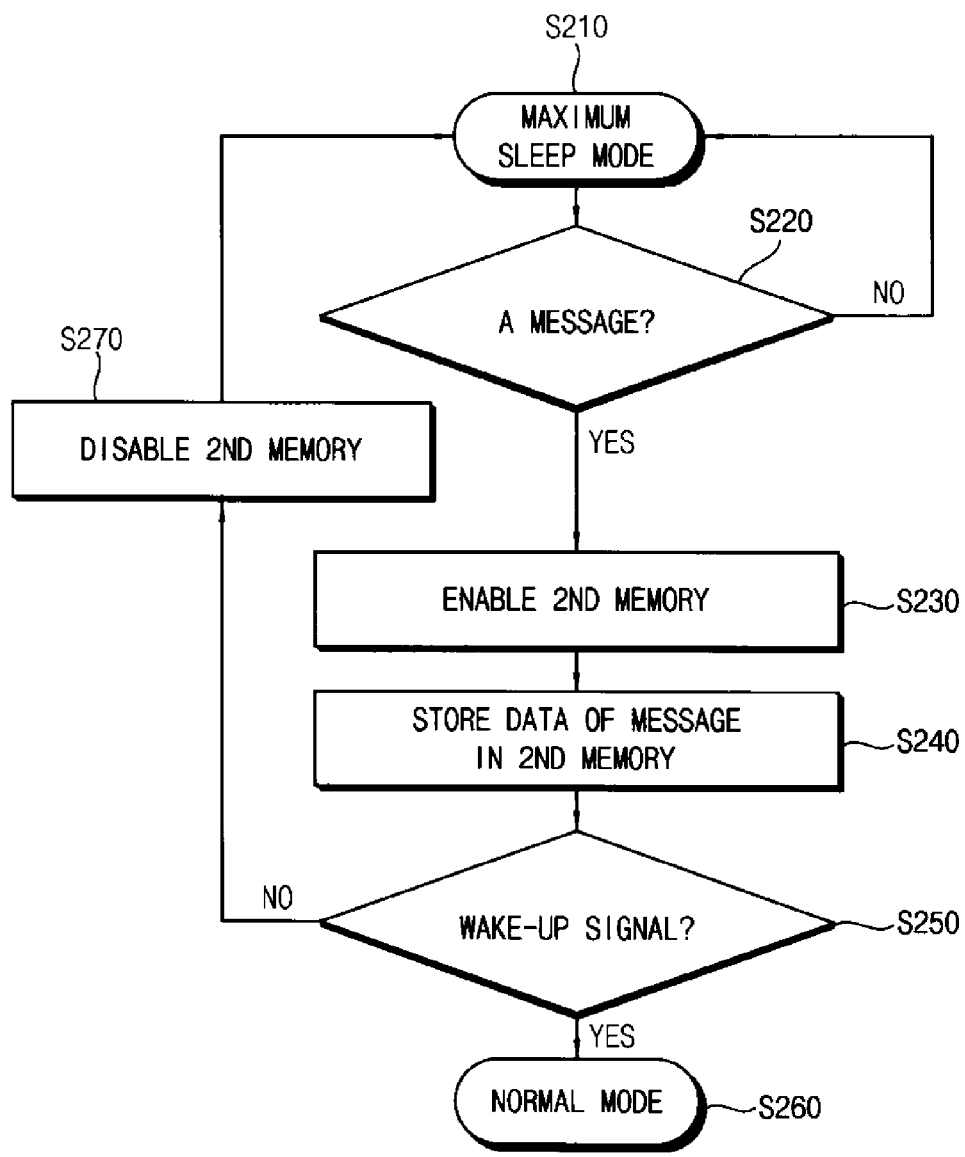
FIG. 11 is a flowchart illustrating a method of operating a computer system according to an example embodiment of the inventive concepts.

FIG. 11 is a flowchart illustrating a method of operating a computer system according to an example embodiment of the inventive concepts.

Referring to FIGS. 8, 10 and 11, in the maximum or, alternatively, high-level sleep mode (S210), the main memory device 4300 is disabled but the call processor 4200 may be enabled to receive the transmission signal such as a text message signal, a call signal, a push message signal, etc. As described, the first memory device 4310 may include the volatile memory device such as the DRAM and the second memory device 4320 may include the non-volatile memory device such as the STT-MRAM. When the transmission signal such as a message is received from an external device (S220: YES), the second memory device 4320 is enabled or powered on (S230), and the second memory device 4320 stores the data of the transmission signal (S240). While the transmission signal is not received (S220: NO), the maximum or, alternatively, high-level sleep mode 5210 is maintained. After storing the data, it is determined whether a wake-up signal generated as a result of an inputting action of the user is received (S250). If the wake-up signal is received or activated (S250: YES), the first memory device 4310 in addition to the second memory device 4320 is enabled to enter the normal mode (S260). If the wake-up signal is not received for a predetermined time interval (S250: NO), the second memory device 4320 is disabled to return to the maximum or, alternatively, high-level sleep mode (S210).

In some example embodiments, when the call processor 4200 receives the call signal from the external device during the maximum or, alternatively, high-level sleep mode, it is determined whether the wake-up signal is received to the computer system 4000 until the call signal expires. If the wake-up signal is not received, at least a portion of the second memory device 4320 may be activated or enabled to store a call record and the second memory device 4320 may be powered off.

Hereinafter, a computer system and a method of operation a computer system according to another example embodiment are described with reference to referring to FIGS. 12 through 15. In this embodiment, also the call processor may be powered off but periodically activated in the maximum or, alternatively, high-level sleep mode to further reduce the power consumption of the computer system.

Figure 12:
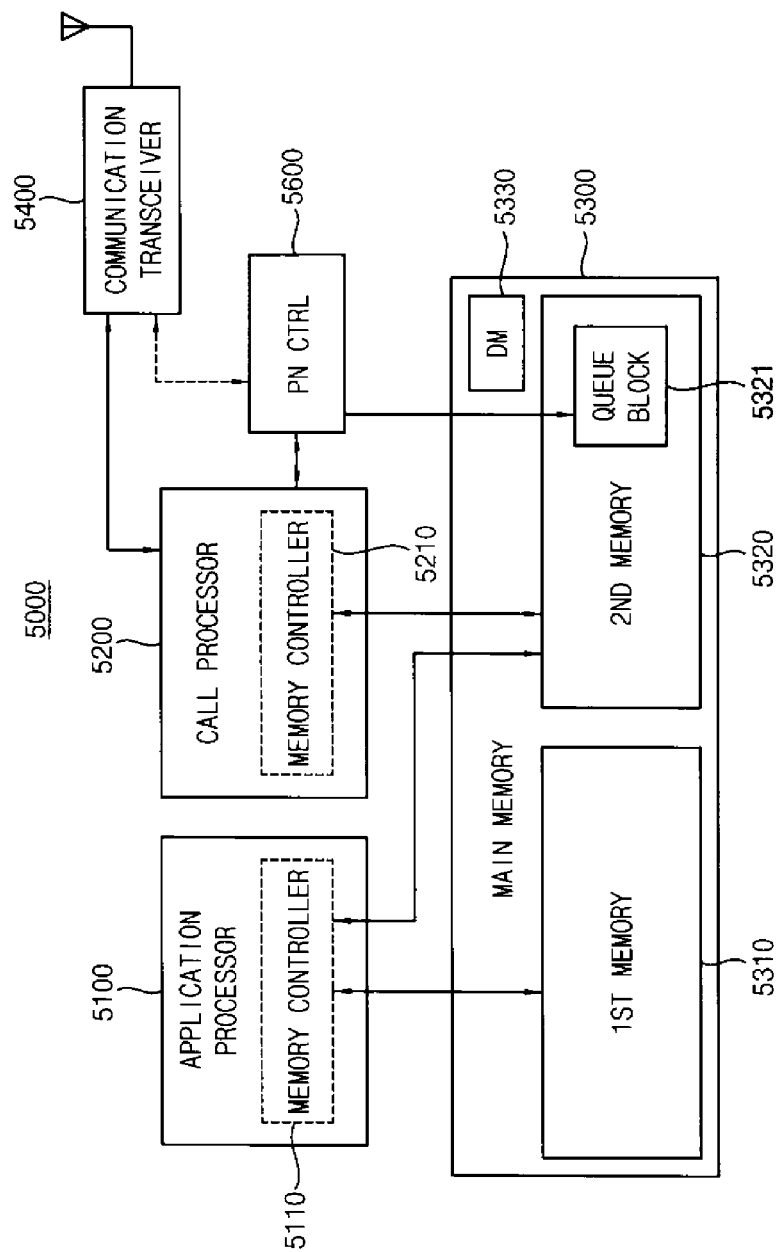
FIG. 12 is a block diagram illustrating a computer system according to an example embodiment of the inventive concepts.

FIG. 12 is a block diagram illustrating a computer system according to an example embodiment of the inventive concepts.

Referring to FIG. 12, a computer system 5000 includes an application processor 5100, a call processor 5200, a main memory device 5300, a communication transceiver 5400 and a push notification controller (PN CTRL) 5600. The main memory device 4500 may include a first memory device 5310, a second memory device 4520 and a data transfer manager (DM) 4530.

The application processor 5100 drives a general purpose operating system (OS). The application processor 5100 may perform various user interface tasks such as a game, a news service, a map service, banking task, etc. The application processor 5100 may include a memory controller 5110 for controlling the access to the first and second memory devices 5310 and 5320. The memory controller 5110 may further control the operation modes of the main memory device 5300.

The call processor 5200 drives a realtime OS. The call processor 5200 may handle communication tasks such as a text message, a (phone) call, a push message, etc. The call processor 5200 may include a memory controller 5210 for controlling the second memory device 5320. The call processor 5200 may receive wireless signals through the wireless communication transceiver 5400. For example, the wireless communication transceiver 5400 may convert an optical or, alternatively, radio signal received by an antenna to an electrical signal that may be processed by the call processor 5200. The call processor 5200 processes the signal from the wireless communication transceiver 5400 and transfers the processed signal or data to the main memory device 5300.

The push notification controller 5600 may be implemented with a low-power processor that is coupled to the communication processor 5400 to receive the push messages periodically even in the maximum or, alternatively, high-level sleep mode. The push notification controller 5600 may count a predetermined time interval during the maximum or, alternatively, high-level sleep mode to activate the call processor 5200 and a queue block 5321 by a period corresponding to the predetermined time interval. The queue block 5321 is included in the second memory device 5320 and the queue block 5321 may be dedicated to store the push messages. Only the queue block 5321 may be enabled in the second memory device 5320 to receive the push messages during the maximum or, alternatively, high-level sleep mode. The push notification controller 5600 may control a display device (not shown) to display the input push message even though the application processor 5100 is deactivated or disabled in the maximum or, alternatively, high-level sleep mode.

The main memory device 5300 stores the data for the operations of the application processor 5100 and the call processor 5200. The main memory device 5300 may include the first memory device 5310 implemented with a volatile memory, the second memory device 5320 implemented with a non-volatile memory, and the data transfer manager 5330. In an example embodiment, the first memory device 5310 may include the DRAM and the second memory device 5320 may include the STT-MRAM.

The general purpose OS is loaded in the first memory device 5310 and the data for the operations of the application processor 5100 and the call processor 5200 are stored in the first memory device 5310. The realtime OS or the minimized OS for the simple operation of the system and the associated data may be loaded or stored in the second memory device 5200. The second memory device 5320 may include the queue block 5321 configured to be activated to receive the push messages periodically during the maximum or, alternatively, high-level sleep mode.

When entering the maximum or, alternatively, high-level sleep mode, the main memory device 5300 may read a portion of data stored in the first memory device 5310 to store the read data in the second memory device 5320, and then the first memory device 5310 and the second memory device 5320 may be powered off. The data associated with the wireless communication, which are stored in the heap region of the first memory device 5310, may be copied and moved to the second memory device 5320. For example, the data required for a social network service (SNS), an e-mailing service, a clouding service, a remote access service, etc. may be copied from the first memory device -54310 to the second memory device -54320. The data transfer manage 5330 may be configured to control such data transfer from the first memory device 5310 to the second memory device 5320. Elements of the computer system 5000 may be powered off by, for example, a power managing circuit included in the computer system 5000.

Figure 13:
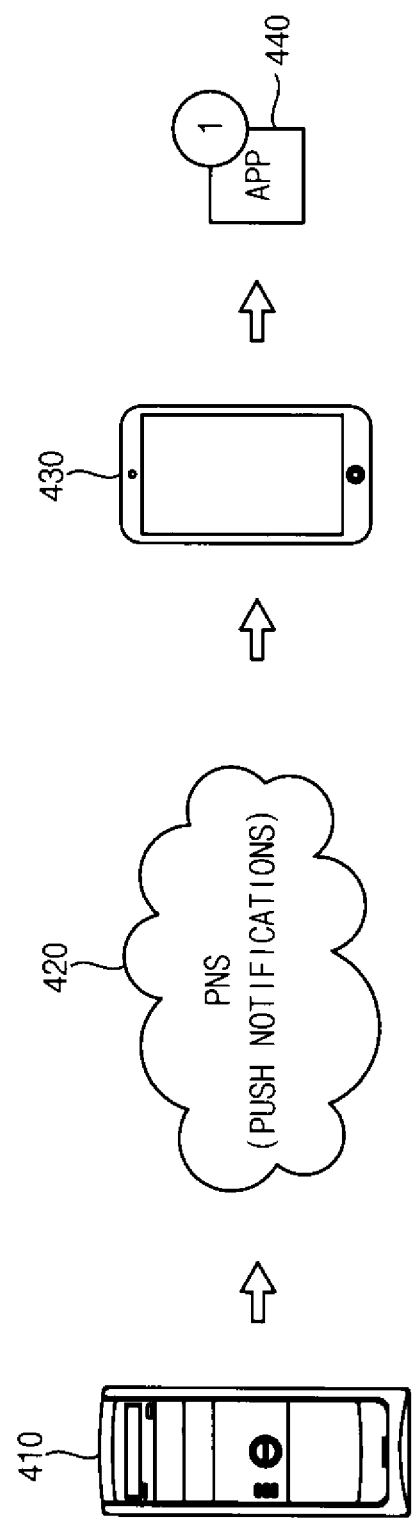
FIG. 13 is a diagram for describing a reception of push messages by a computer system according to an example embodiment of the inventive concepts.

FIG. 13 is a diagram for describing a reception of push messages by a computer system according to an example embodiment of the inventive concepts.

Push technology refers to technology whereby if a user of the computer system selects a certain information category under internet environments, recent information is provided or pushed into the computer system automatically and periodically. Even though the user does not ask the information each time, the server may provide the particular information through the push technology. In case of the conventional browsers, the user has to perform a search for desired information. By the push technology, the user may obtain the information on the category or subject selected in advance if only the computer system of the user can access the website providing the information.

Referring to FIG. 13, a push message originated from at least one provider 410 or a server may be transferred to a mobile device 430 through a push notification service (PNS) 420. The push notification service 420 is a clouding service implanting the push technology. For example, the iPhone supports apple push notification (APN), the Android phone supports cloud to device messaging (C2DM), and the window phone supports Microsoft push notification service (MPNS). The mobile phone 430 may be any terminal such as a smart phone, a tablet PC, etc.

When the mobile device 430 receives the push message, the operating system driven by the mobile device 430 inform the application (APP) 440 associated with the push service of the fact that the push message is received. Even though the application 440 is in the idle state, the operating system may monitor the reception of the push message to provide a notification to the corresponding application 440.

Figure 14:
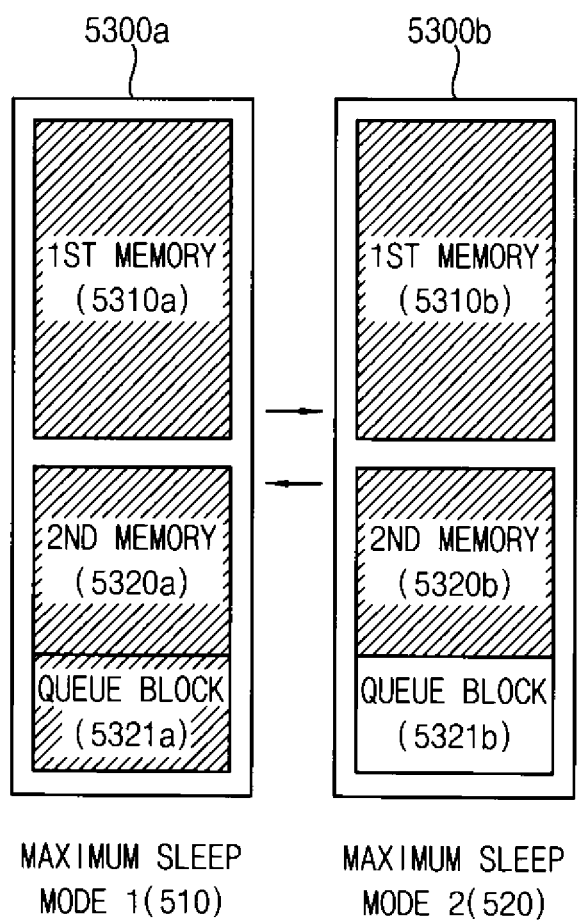
FIG. 14 is a diagram illustrating states of a main memory device in a maximum or, alternatively, high-level sleep mode according to an example embodiment of the inventive concepts.

FIG. 14 is a diagram illustrating states of a main memory device in a maximum or, alternatively, high-level sleep mode according to an example embodiment of the inventive concepts.

Referring to FIGS. 12 and 14, in a first maximum or, alternatively, high-level sleep mode 510, lowered or blocked is the power provided to the first memory device 5310a and the second memory device 5310b in the main memory device 5300a. In a second maximum or, alternatively, high-level sleep mode 520, the queue block 5321b in the second memory device 5320b is activated. The push notification processor 5600 may count the predetermined time interval to activate the call processor 5200 periodically. In addition, the push notification controller 5600 may further activate the queue block 5321b. The call processor 5200 may receive all of push messages transmitted during the predetermined time interval to store the push messages in the queue block 5321b. After storing the push messages, the main memory device 5300a returns to the first maximum or, alternatively, high-level sleep mode 510 and the queue block 5321a is powered off. In other words, the first maximum or, alternatively, high-level sleep mode 510 and the second maximum or, alternatively, high-level sleep mode 520 may occur alternatively.

Figure 15:
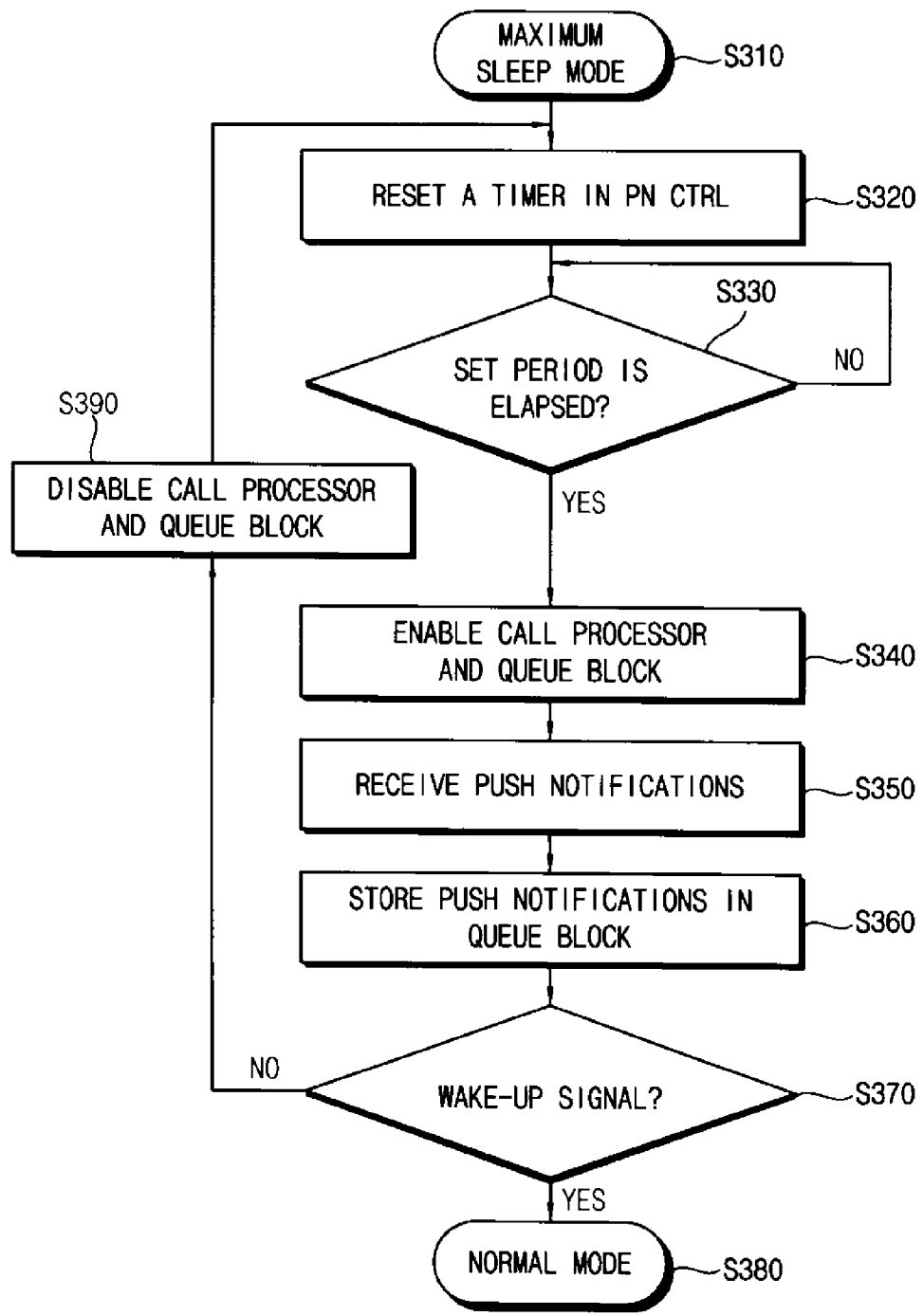
FIG. 15 is a flowchart illustrating a method of operating a computer system according to an example embodiment of the inventive concepts.

FIG. 15 is a flowchart illustrating a method of operating a computer system according to an example embodiment of the inventive concepts.

Referring to FIGS. 12, 14 and 15, in the maximum or, alternatively, high-level sleep mode (S310), the main memory device 5300 is disabled or deactivated. In addition, the power provided to the application processor 5100 and the call processor 4200 may be reduced or blocked.

When the computer system 5000 enters the maximum or, alternatively, high-level sleep mode (S310), the push notification controller 5600 resets a timer therein (S320) and counts a predetermined time interval, that is, a set period. The push notification controller 5600 determines whether the set period is elapsed (S330). When the set period is elapsed (S330: YES), the push notification controller 5600 enables the call processor 5200 and the queue block 5321 in the second memory device 5320 (S340).

The enabled call processor 5200 receives all of transmission signals received during the predetermined time interval (S350) and stores the data of the transmission signals in the queue block 5321 (S360). The transmission signal may include at least one of a text message signal, a call signal and a push message signal.

After the data are stored, it is determined whether a wake-up signal by an inputting action of the user is received (S370). If the wake-up signal is received or activated (S370: YES), the first memory device 5310 in addition to the second memory device 5320 is enabled to enter the normal mode (S380). If the wake-up signal is not received for a predetermined time interval (S370: NO), the call processor 5600 and the queue block 5321 are disabled to return to the maximum or, alternatively, high-level sleep mode (S310).

Figure 16:
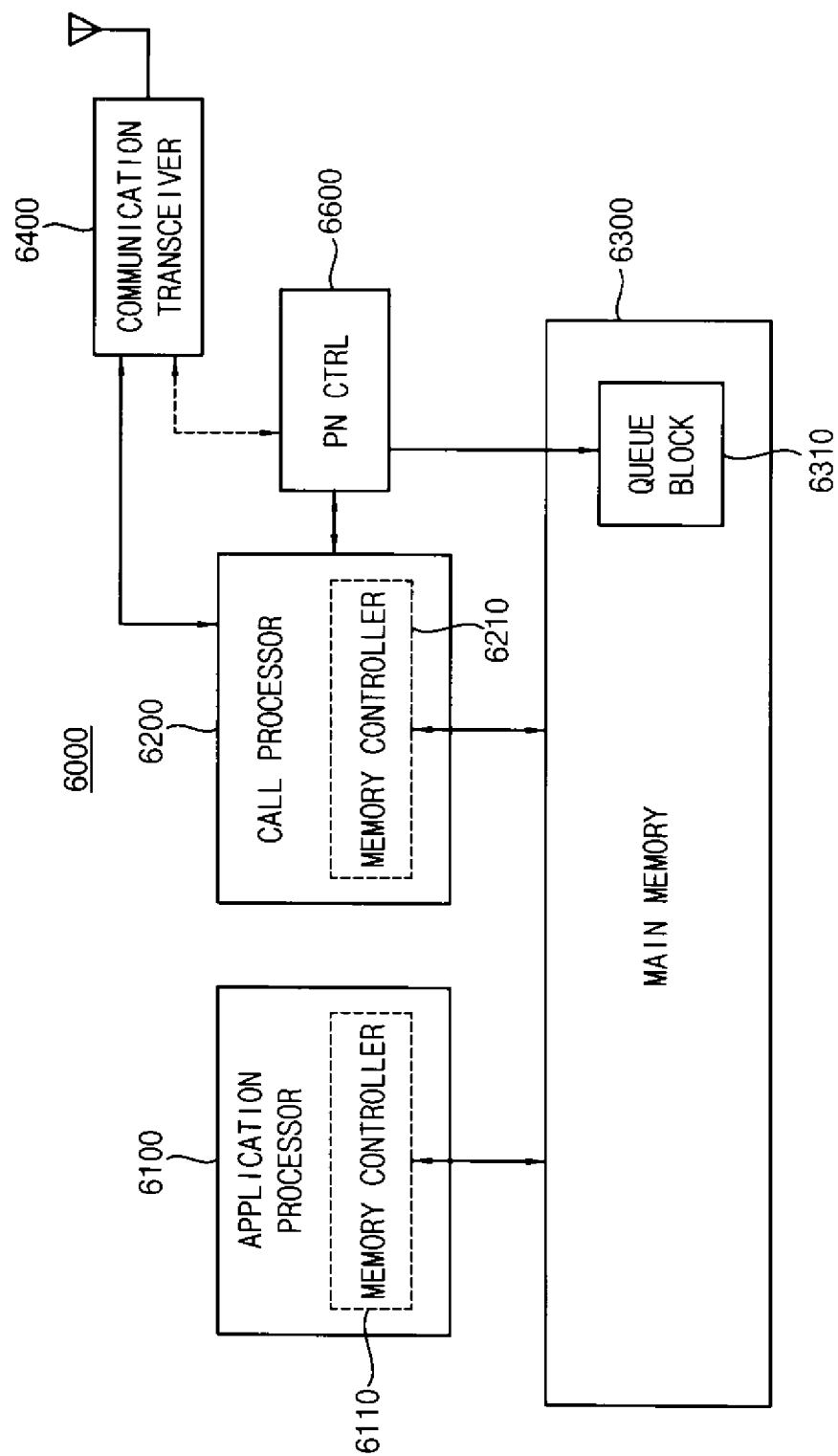
FIG. 16 is a block diagram illustrating a computer system according to an example embodiment of the inventive concepts.

FIG. 16 is a block diagram illustrating a computer system according to an example embodiment of the inventive concepts. In some example embodiments as illustrated in FIG. 16, a computer system 6000 may include a main memory device that is implemented with only the non-volatile memory, whereas the main memory device includes both of the volatile memory and the non-volatile memory in the above-described embodiments. The other elements are similar to the above-described embodiments and thus the repeated description may be omitted.

Referring to FIG. 16, the computer system 6000 includes an application processor 6100, a call processor 6200, a main memory device 6300, a communication transceiver 6400 and a push notification controller (PN CTRL) 6600.

The application processor 6100 drives a general purpose operating system (OS). The application processor 6100 may perform various user interface tasks such as a game, a news service, a map service, banking task, etc. The application processor 6100 may include a memory controller 6110 for controlling the access to the main memory device 6300. The memory controller 6110 may further control the operation modes of the main memory device 6300.

The call processor 6200 drives a realtime OS. The call processor 6200 may handle communication tasks such as a text message, a (phone) call, a push message, etc. The call processor 6200 may receive wireless signals through the wireless communication transceiver 6400. For example, the wireless communication transceiver 6400 may convert an optical or, alternatively, radio signal received by an antenna to an electrical signal that may be processed by the call processor 6200. The call processor 6200 processes the signal from the wireless communication transceiver 5400 and transfers the processed signal or data to the main memory device 6300. The call processor 6200 may include a memory controller 6210 for controlling the main memory device 6300.

The push notification controller 6600 may be implemented with a low-power processor that is coupled to the communication processor 6400 to receive the push messages periodically even in the maximum or, alternatively, high-level sleep mode. The push notification controller 6600 may count a predetermined time interval during the maximum or, alternatively, high-level sleep mode to activate the call processor 6200 and a queue block 6310 by a period corresponding to the predetermined time interval. The push notification controller 6600 may control a display device (not shown) to display the input push message even though the application processor 6100 is deactivated or disabled in the maximum or, alternatively, high-level sleep mode.

The main memory device 6300 stores the data for the operations of the application processor 6100 and the call processor 6200. The main memory device 6300 may include a non-volatile memory such as MRAM, STT-MRAM, etc. The queue block 6310 in the main memory device 6300 may be dedicated to store the push messages, and only the queue block 6310 may be activated in the second memory device 6310 to receive the push messages during the maximum or, alternatively, high-level sleep mode. The queue block 6310 may be activated periodically and the queue block 6310 may be powered off after the push messages are stored. Elements of the computer system 6000 may be powered off by, for example, a power managing circuit included in the computer system 6000.

The system and the method of operation a system according to example embodiments of the inventive concepts may be applied to arbitrary devices and systems including a main memory. Particularly the system and the method may be applied usefully to mobile devices such as a digital camera, a mobile phone, a smart phone, a personal digital assistant (PDA), a portable multimedia player (PMP), etc., which require high performance and lower power consumption.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of example embodiments of the inventive concepts. Accordingly, all such modifications are intended to be included within the scope of example embodiments of the inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A main memory system comprising:
a main memory device including a first memory device implemented with a volatile memory and a second memory device implemented with a non-volatile memory,
the main memory system being configured such that,
when entering a sleep mode, the memory device reads a portion of data stored in the first memory device to store the read data in the second memory device, and, after the portion of data is read, the first memory device and the second memory device are powered off, and
when a transmission signal is received from an external device during the sleep mode, the second memory device is powered-on to store data of the transmission signal without powering-on the first memory device, and then the second memory device is powered off.

2. The main memory system of claim 1, wherein the first memory device includes a dynamic random access memory (DRAM) and the second memory device includes a spin-transfer torque magneto-resistive random access memory (STT-MRAM).

3. The main memory system of claim 1, wherein the main memory device further includes a data transfer manager configured to store data in the second memory device by transferring data stored in the first memory device to the second memory device.

4. A computing system comprising:
a main memory device including a first memory device implemented with a volatile memory and a second memory device implemented with a non-volatile memory; and
a power management unit configured to control a supply of power to the main memory device,
the computing system being configured such that, when the main memory device enters a sleep mode,
the main memory device reads data stored in the first memory device,
the main memory stores the read data in the second memory device, and
after the read data is stored in the second memory device, the power management unit powers off the first memory device and the second memory device, and
the computing system being configured such that, when a transmission signal is received from an external device during the sleep mode, the second memory device is powered-on to store data of the transmission signal without powering-on the first memory device, and then the second memory device is powered off.

* * * * *